L. S. FALES.
Treating Gas Liquor for Ammonia Salts.
No. 195,998. Patented Oct. 9, 1877.
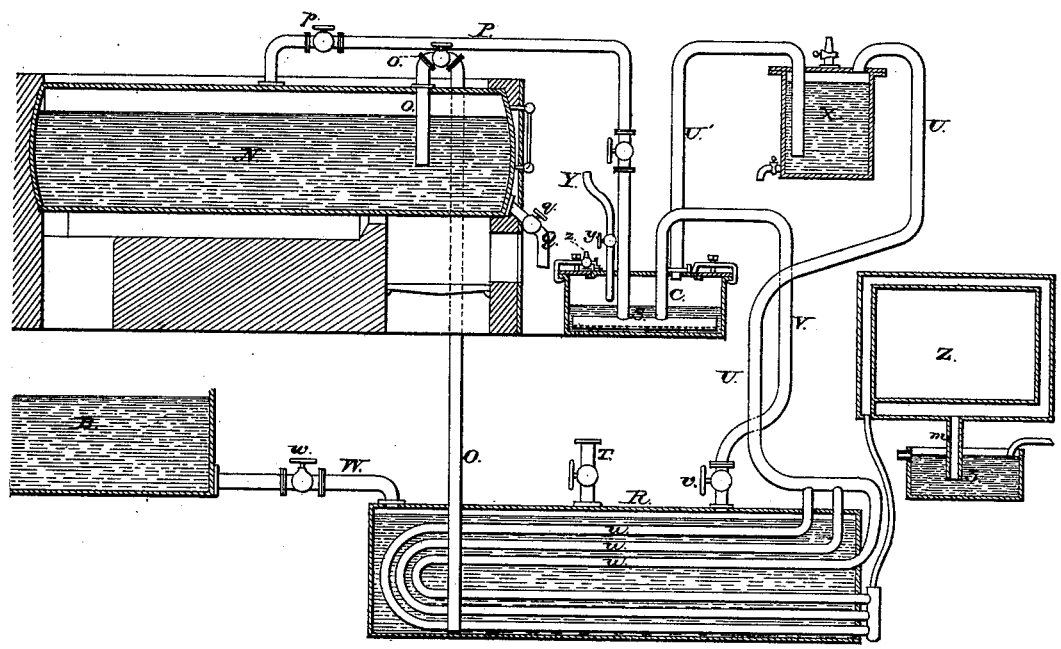
Attest:
John Becker
Fred. Haynes
Inventor:
L. S. Fales
by his Attorneys
Brown & Allen

UNITED STATES PATENT OFFICE.

LEVI S. FALES, OF CAMBRIDGEPORT, MASSACHUSETTS.

IMPROVEMENT IN TREATING GAS-LIQUOR FOR AMMONIA SALTS.

Specification forming part of Letters Patent No. 195,998, dated October 9, 1877; application filed April 28, 1877.

*To all whom it may concern:*

Be it known that I, LEVI S. FALES, of Cambridgeport, in the county of Middlesex and State of Massachusetts, have invented certain new and useful Improvements in the Manufacture of Sulphate of Ammonia; and I do hereby declare that the following is a full, clear, and exact description of the same, reference being had to the accompanying drawing, forming part of this specification.

This invention relates to certain improvements in the manufacture of sulphate of ammonia from the ammonia evolved in the manufacture of illuminating-gas, and held in solution in the water in the hydraulic mains, its object being to manufacture such sulphate in an economical manner, and in a state of purity, and at the same time prevent the escape into the atmosphere of the poisonous sulphureted hydrogen, which is also evolved in large quantities in the manufacture of the gas, and also to save and utilize the heat carried off by the sulphureted hydrogen; and the invention consists in the combination of a tank or boiler for heating the ammoniacal liquor to expel the ammonia and sulphureted hydrogen, a crystallizing-chamber for separating the ammonia from the sulphureted hydrogen, and for producing and crystallizing the sulphate of ammonia, and a tank or heater through which the escaping sulphureted hydrogen is finally passed, and in which the heat is abstracted and utilized for heating fresh ammoniacal liquor preparatory to its introduction into the first-mentioned tank or boiler, as more fully hereinafter set forth.

The drawing represents a sectional elevation of my improved apparatus.

N is a boiler or evaporator, like an ordinary plain cylindrical steam-boiler, or other boiler for generating steam, heated by a furnace, and provided with a feed-pipe, O, a steam-pipe, P, and a blow-off cock, Q, furnished with suitable stop-valves o p q, and otherwise like the corresponding pipes of a common steam-boiler. The steam-pipe P connects with a perforated pipe or coil, S, in the lower part of the crystallizing-tank C. The feed-pipe O connects with the lower part of a close heating-vessel, R, of a capacity corresponding with that of the boiler N, which is fed with the cold ammoniacal water from the tank B through a pipe, W, furnished with a stop-cock, w, such water, after being heated, being intended to be discharged from the heater through the feed-pipe O into the boiler N by the pressure of steam admitted to the heater from any other suitable generator through the pipe T. A connection is also made from the top of the heater R by a pipe, V, with the perforated pipe or coil S in the crystallizing-chamber C, and this pipe is furnished with a stop-cock, r. To the top of the crystallizing-chamber is connected a pipe, U', which enters and passes down nearly to the bottom of a close tank, X, which contains a solution of sulphuric acid and water, and to the top of which is connected a pipe, U, from which two or more pipes, u u, in the form of coils, branch off into and through the heater R. A pipe, Y, furnished with a stop-cock, y, enters the crystallizing-chamber C, to introduce sulphuric acid into the said chamber from a suitable reservoir, and a pet or test cock, Z, is fitted to the top of the said chamber.

In manufacturing the sulphate of ammonia from the ammoniacal water, a charge of such water is introduced to the boiler N, either by first pumping it thereinto from the tank B into the heater R, and afterward forcing it by steam from the heater into the boiler, or else by pumping or otherwise forcing the said water directly from the tank B to the boiler. The heater R has also a charge of the said water introduced into it. Fire being made under the boiler N, and its contents being suitably heated, the ammonia is evaporated, and the sulphureted-hydrogen gas expelled from it. The ammonia vapor and the gas, with some steam, pass through the pipe P, and are discharged through the perforated pipe S into the crystallizing-tank C, where the ammonia combines with the sulphuric acid introduced by the pipe Y, and sulphate of ammonia is produced in crystalline form, its crystallization being aided by the heat of the steam and sulphureted hydrogen issuing from the perforated pipe S. The gas and steam escape from the crystallizing-chamber by the pipe U, and pass through the acid solution in the tank X; and if any free ammonia should pass over from the crystallizing-tank, by reason of all the acid in said chamber being taken up, it will be caught in the acid solution in the said tank X. The steam and sulphureted hydrogen escape from the tank X by the pipe U, and, circulating through the pipes $u$ $u$ in the heater, heat the water in the said heater preparatory to the transfer of the said water to the boiler N, after the charge in the boiler has been sufficiently exhausted of its ammonia. If any evaporation takes place in the heater, the vapors pass from it, through the pipe V and perforated pipe or coil, into the crystallizing-chamber, to be therein converted into sulphate of ammonia.

The sulphureted-hydrogen gas and steam escaping from the pipes $u$ $u$ may be used to heat a drying-chamber, Z, in which the crystallized salts may be dried, and the gas escaping from the jacket or coils, in which it has been used to heat the said drying-chamber, together with the water of condensation, are conducted by a pipe, $m$, into a tank, 3, which is kept constantly supplied with fresh cold water, and overflowing, and this water absorbs the sulphureted hydrogen, and carries it off to a sewer or other suitable place.

This utilization of the heat of the sulphureted-hydrogen gas escaping from the boiler, first to heat the crystallizing-chamber, and afterward to heat the ammoniacal water, preparatory to its introduction to the boiler, is a very important feature of my invention, not only on account of economy of heat, but also by reason of its so cooling and facilitating the absorption of the said gas as to prevent its escape into and poisoning of the atmosphere.

After the first charge of water in the boiler N has been exhausted, as far as practicable or desirable, of its ammonia, the spent water is drawn off by the pipe Q, and the heated charge of water in the heater is transferred to the boiler by opening the cock $o$ and admitting steam to the heater by the pipe T, and a fresh charge of water is admitted to the heater R, and the operation is repeated, as before described.

It will be soon known approximately, by experience in conducting the operation, how much acid will be required in the crystallizing-chamber to combine with the ammonia contained in one charge of the boiler, and also how long it will take to evaporate all the ammonia from the charge; but when it is supposed that the ammonia has nearly all been evaporated and combined, the petcock Z on the crystallizing-chamber may be opened, a litmus-paper test applied, and, if any ammonia be found to escape, a little more acid may be introduced through the pipe Y.

Two crystallizing-chambers may be provided, which may be used alternately, each to be used while the crystals are being taken out from the other.

What I claim as my invention is—

1. The combination, with the evaporator N, of the closed crystallizing-chamber C, connected with said boiler by means of the pipe P, and the vessel R, provided with a series of tubes, $u$ $u$, communicating with the crystallizing-chamber by pipes U U', the said vessel R communicating with the evaporator N by means of pipe O, the whole arranged substantially as described, for the purpose of utilizing the waste heat of the steam and sulphureted hydrogen for heating a fresh supply of ammoniacal liquor, substantially as specified.

2. The combination of the heater R, the crystallizing-chamber C, and the pipes V S, substantially as and for the purpose herein described.

3. The mode of utilizing the waste heat carried off by the sulphureted-hydrogen gas in the manufacture of sulphate of ammonia, and at the same time depriving the same of its deleterious effects by heating the incoming ammoniacal liquor, and simultaneously cooling the gas previous to passing it into water to absorb it.

LEVI S. FALES.

Witnesses:
JAMES L. NORRIS,
JAMES M. WRIGHT.